(12) United States Patent
Jacobsen et al.

(10) Patent No.: US 10,328,676 B2
(45) Date of Patent: Jun. 25, 2019

(54) COMPOSITE STRUCTURE

(71) Applicants: Peter Andreas Lund Jacobsen, Svenstrup J (DK); Peter Kybelund, Egtved (DK)

(72) Inventors: Peter Andreas Lund Jacobsen, Svenstrup J (DK); Peter Kybelund, Egtved (DK)

(73) Assignee: SIEMENS GAMESA RENEWABLE ENERGY A/S, Brande (DK)

( * ) Notice: Subject to any disclaimer, the term of this patent is extended or adjusted under 35 U.S.C. 154(b) by 1265 days.

(21) Appl. No.: 14/181,685

(22) Filed: Feb. 16, 2014

(65) Prior Publication Data
US 2014/0295187 A1  Oct. 2, 2014

(30) Foreign Application Priority Data
Mar. 28, 2013  (EP) .................................... 13161600

(51) Int. Cl.
*B32B 7/10* (2006.01)
*B32B 17/04* (2006.01)
(Continued)

(52) U.S. Cl.
CPC .............. *B32B 27/08* (2013.01); *B32B 5/024* (2013.01); *B32B 7/10* (2013.01); *B32B 17/04* (2013.01);
(Continued)

(58) Field of Classification Search
CPC ........... B32B 7/10; B32B 17/04; B32B 27/08; B32B 27/12; B32B 2260/021; B32B 2260/046; C08J 5/04; C08J 5/24; F03D 1/06; F03D 1/0675; F05B 2280/4007; F05B 2280/6003; F05B 2280/6015
See application file for complete search history.

(56) References Cited

U.S. PATENT DOCUMENTS

| 5,098,778 A | 3/1992 | Minnick |
| 8,211,268 B1 | 7/2012 | Raghavendran |

(Continued)

FOREIGN PATENT DOCUMENTS

| CN | 101842230 A | 9/2010 |
| EP | 2543874 A1 | 1/2013 |

(Continued)

OTHER PUBLICATIONS

CN Office Action dated Dec. 12, 2016, for CN patent application No. 201410121412.0.

*Primary Examiner* — Brian P Mruk
(74) *Attorney, Agent, or Firm* — Beusse Wolter Sanks & Maire

(57) ABSTRACT

A composite structure having a number of thermoset resin containing elements and a number of thermoplastic elements and at least one interface between the thermoset resin containing elements and the thermoplastic elements is provided. The thermoset resin containing elements and the thermoplastic elements have functional groups at the interface which bond to each other when the composite structure is cured and the functional groups are independently selected from amines, carboxylic acids, acid anhydrides, oxiranes, and derivatives thereof in their non-bonded condition. Additionally, a blade having such a composite structure is provided.

14 Claims, 2 Drawing Sheets

(51) Int. Cl.
- *B32B 27/08* (2006.01)
- *B32B 27/12* (2006.01)
- *C08J 5/04* (2006.01)
- *C08J 5/24* (2006.01)
- *F03D 1/06* (2006.01)
- *B32B 5/02* (2006.01)

(52) U.S. Cl.
CPC ............... *B32B 27/12* (2013.01); *C08J 5/04* (2013.01); *C08J 5/24* (2013.01); *F03D 1/0675* (2013.01); *B32B 2260/021* (2013.01); *B32B 2260/046* (2013.01); *B32B 2262/101* (2013.01); *B32B 2274/00* (2013.01); *B32B 2307/54* (2013.01); *B32B 2603/00* (2013.01); *F05B 2280/4007* (2013.01); *F05B 2280/6003* (2013.01); *F05B 2280/6015* (2013.01); *Y02E 10/721* (2013.01); *Y10T 428/31511* (2015.04)

(56) References Cited

U.S. PATENT DOCUMENTS

| | | |
|---|---|---|
| 2002/0187702 A1 | 12/2002 | Delusky |
| 2006/0110599 A1 | 5/2006 | Honma |
| 2008/0145615 A1 | 6/2008 | Jacobsen |
| 2010/0261000 A1* | 10/2010 | Jones ................ B29C 44/1228 428/313.5 |

FOREIGN PATENT DOCUMENTS

| | | |
|---|---|---|
| JP | 2005297417 A | 10/2005 |
| WO | 2012149939 A2 | 11/2012 |
| WO | 2013026925 A1 | 2/2013 |

* cited by examiner

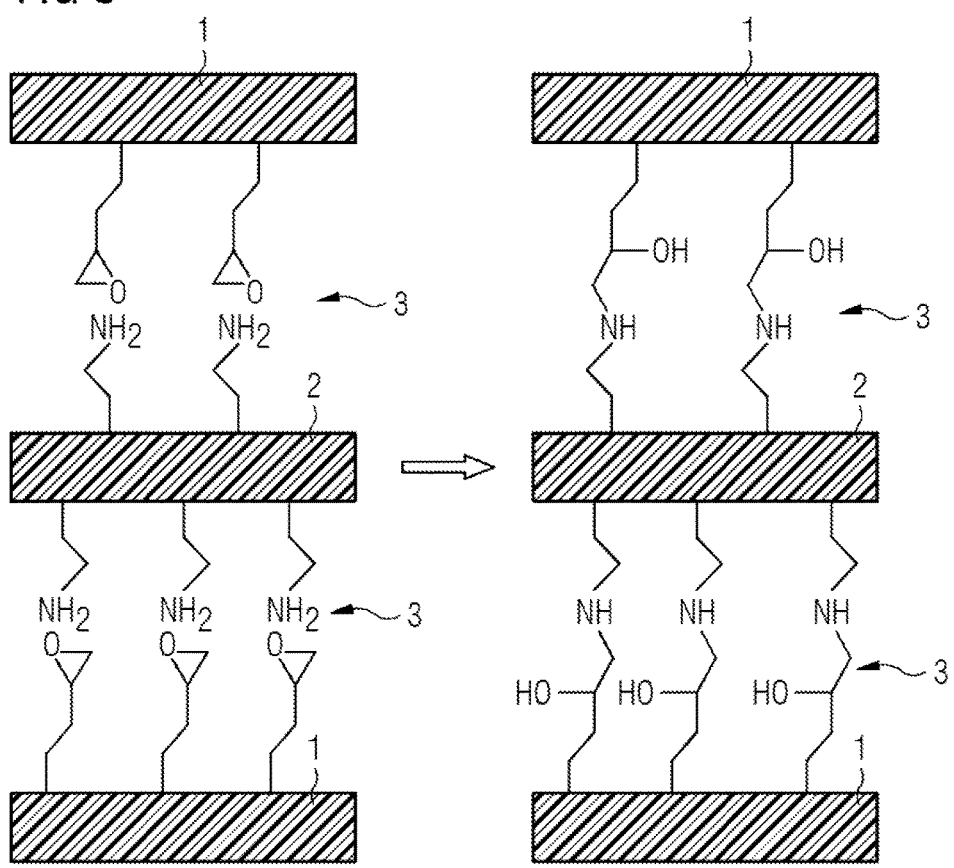

COMPOSITE STRUCTURE

CROSS REFERENCE TO RELATED APPLICATIONS

This application claims the benefit of European Application No. EP13161600 filed Mar. 28, 2013, incorporated by reference herein in its entirety.

FIELD OF INVENTION

The invention describes a composite structure based on a number of thermoset resin elements, in particular a composite structure for the use in a blade, for example as a part of a wind turbine system, and to a blade comprising such a composite structure.

BACKGROUND OF INVENTION

Blades for wind turbine systems were traditionally made of several fiber-reinforced resin containing components. Commonly, blades are casted in one piece or in several pieces, for example two shells, which are then glued to each other. The dominant processing method of producing the resin containing components such as the blades is vacuum resin infusion. An alternative processing method is prepreg molding with woven or unidirectional glass fabrics which already contain the resin as the matrix material.

In order to withstand large and repeated loads, the wind turbine blades were conventionally made from thermoset resins having good mechanical properties. Therefore, typical resin containing components were laminates composed of several reinforced resin layers overlaying each other and building up the finished blade structure. Generally, the blade materials were selected to provide a high rigidity and resistance to torsion and fatigue to the blades. Because of the mechanical performance of such blades, epoxy resins were typically used, especially, if longer blades of more than 40 or 50 m were manufactured. Similar techniques and resin materials for composite structures were applied in the automotive industry for example.

The amount of reinforced resin material used in such thermoset elements make the resultant parts heavier than corresponding non-reinforced parts, wherein the amount of reinforcement used generally depends on the mechanical requirements. In the patent application US 2002/01787702 A1, composite parts for automotive applications have been proposed which are made of a combination of a thermoplastic first layer and a second thermoset layer. The first layer made of a thermoplastic material provides a good surface finish and reduces overall part weight, while the second layer made of a thermoset resin provides a good strength and rigidity to the composite part. The thermoplastic layer and the thermoset layer are bonded to each other by the use of an adhesion site activated by a component of the unreacted thermoset resin that acts on a component of the thermoplastic resin or by a mechanical penetration of a thin, porous layer by the two resins. Styrene groups are used as such active sites.

The incorporation of some thermoplastic elements into a composite structure as has been described in the field of automotive applications was also considered in the field of wind turbine blades. These considerations were made either for enhancing processing capabilities or for achieving an effect of the element in the use of a laminate.

In wind turbine blade applications, however, it was investigated that the resulting mechanical properties of the laminate material comprising thermoplastic and thermoset resins were affected to some extent, most often negatively. This was caused mainly from inferior material properties of the thermoplastic or inferior interface properties between the thermoplastic and the thermoset resin layers. Therefore, if such composites were applied, the amount of thermoplastic materials in the composite structures was reduced as much as possible.

SUMMARY OF INVENTION

It is therefore an object of herein to overcome the aforementioned disadvantages of common composite structures comprising both a thermoset resin element and a thermoplastic element and, especially, to improve the mechanical properties of such a composite material.

According to aspects of the invention, the composite structure comprises a number of thermoset resin containing elements and a number of thermoplastic elements and at least one interface between the thermoset resin containing elements and the thermoplastic elements. A number means in the context of the present invention that one or more, for example, at least two, more than two or multiple elements of the same type, that means thermoplastic or thermoset resin containing elements, are comprised in the structure. They can be arranged next to each other or in consecutive order of different types like a stacked laminate of thermoplastic elements and thermoset resin containing elements. Therefore, one or more interfaces between the thermoset resin containing elements and thermoplastic elements, respectively, are comprised in a composite structure according to the invention.

As the connection of the thermoset resin containing elements and the thermoplastic elements at the interfaces are crucial for the material properties of the composite structure, the thermoset resin containing elements and the thermoplastic elements comprise functional groups at the interface which bond to each other when the composite structure is cured or hardened. The mechanical properties, e. g. the rigidity of the composite material, are improved by the reactive groups introduced into the thermoplastic material, in particular a resin material, or the thermoset resin or both materials or resins which can form stable bonds between each other.

The functional groups are specifically selected from chemical groups which are harmless to the workers at the manufacturing sites and do not increase work related risks when correctly handling the different resin materials. More particularly, with the term "harmless" it is meant that the functional groups are in general considered to be most likely harmless, for example if they are handled in a "diluted" form in a thermoplastic element or for producing such an element under controlled conditions. Exemplified functional groups which can be introduced into the resin elements are independently selected from amines, carboxylic acids, acid anhydrides, oxiranes, and derivatives thereof in their non-bonded condition. Accordingly, the above-mentioned functional groups react with the respective counter groups in the elements to be connected so that they are no longer present in their non-bonded or cured condition in the finished products. In the finished products, the respectively generated reacted groups essentially are present while the unreacted groups may be present in a non-significant amount only as side-products.

An advantage of incorporating the above-exemplified functional groups into the thermoplastic element and/or the thermoset resin containing element is that they are most likely harmless or non-toxic for the workers or can be handled without extensive safety measures. Any of these groups can bind to the resin component or an auxiliary component in the respective resin element or they can be selected such that two of these functional groups bind to each other, thereby connecting the thermoset resin containing element with the thermoplastic element.

In another aspect of the present invention, a blade comprising a composite structure according to the invention as has been described before is provided. Such a blade is advantageous over current blade technology because it is now possible to include thermoplastic elements into the thermoset resin structure or providing thermoplastic parts at the surface of the blade. In both alternatives, the thermoplastic element is connected to the thermoset resin containing element(s) by means of covalent bonds generated from the respective functional groups during the curing of the resins in at least the thermoset resin containing elements. The thermoplastic elements can be provided inside a laminate structure in the form of sheets or foils, for example. Thus, the mechanical properties of a blade composed mainly of thermoset resin containing elements can be adjusted in a wide manner by introducing a significant amount of thermoplastic elements, while adding other properties to the structure that would be very difficult or impossible to introduce into the finished product using the thermoset resin component only. If the thermoplastic element is provided at the surface of a blade, special elements for improving the aerodynamic of a blade or providing additional functionality to a blade can be mounted during the manufacturing process of a blade. Generally, a high strength of the connection at the interface between the thermoset resin containing element and the thermoplastic element can be provided by the use of the specific functional groups according to the general concept of the invention.

Particularly advantageous embodiments and features of the invention are revealed in the following description. Features may be combined as appropriate to give further embodiments not explicitly described herein, but easily derivable from the context of the described preferred embodiments.

In a preferred embodiment, the composite structure comprises a thermoset resin containing element comprising a two or three component system having at least one resin containing component and at least one hardener, for example one resin component together with two hardeners, wherein the hardeners are not stable in a mixture of them. When a two or three component system is used, the functional groups of the thermoplastic element bind either to the resin component or to the hardener component(s). Alternatively, the functional groups can be adapted such that they can bind to the two components, the resin component and the hardener, in order to improve the connection between the thermoset resin containing element and the thermoplastic element. The connection is stronger if a higher number of bonds per surface area or two or more different types of bonds have been generated at the interfaces in the finished product. From the perspective of saving costs, it is easier and sufficient, if the functional groups are generally provided at one of the elements, e. g., the thermoplastic element, and have the function of bonding either to the resin component or the hardener of the respective other resin element, in this case the thermoset resin containing element, for example. This allows that only one resin element may be particularly provided with specific functional groups while the other element has respective counterparts of the functional groups in their general structure or in a part of their general structure.

The resin containing component used in a composite structure as described before preferably comprises an epoxy resin as the thermoset resin material. The advantage of epoxy resins is that the epoxide groups present in the monomers, oligomers or polymeric partial structures, such as side changes thereof, comprise epoxide groups or remaining epoxide groups which are reactive against amines, carboxylic acids, and acid anhydrides. If an epoxy resin is used in the thermoset resin element, a two component system having an epoxy part and a hardener part is preferred. The hardener is advantageously based on an amine or comprises different amines. It is preferred to use an amount of hardener which is sufficient for curing the epoxy resin and optionally providing additional functionality to the thermoset resin element. In addition, the resin materials used and the hardeners used are generally reactive at temperatures above room temperature so that the thermoset resin elements can easily be handled by room temperature and can be cured at elevated temperatures, e. g. at above 50° C. or higher preferably be from 50 to 120° C. The resins and hardeners used are commercially available from several suppliers and are well known to the skilled person.

Therefore, it is preferred that the composite structure includes a thermoplastic element comprising functional groups reactive with the resin component or with the hardener. In case of epoxy resins as the thermoset resin component in the thermoset resin containing element, the thermoplastic element is advantageously provided with functional groups including, but not limited to, amines, carboxylic acids, and acid anhydrides. In epoxy resin mixtures, the hardener is preferably based on amines. Thus, preferred examples of functional groups that react with epoxy hardeners include, but are not limited to, oxiranes, carboxylic acids, and derivatives thereof.

The functional groups or materials as exemplified before provide a chemical bond between the thermoplastic element and the thermoset resin containing element to ensure improved interface strength. The chemical bonds are covalent bonds which provide an optimum strength to the connection between the two elements. The bonds avoid totally or lower, at least to a significant part, the risk of delamination of the respective elements at their interface as it has been observed in the current technology.

The thermoset resin containing element and the thermoplastic element may be provided with reactive parts, preferably at their surfaces, such that the reactive parts comprise the functional groups as specified before. If the functional groups are provided at the surface of the elements they can easily be presented to the reactive counterparts at the element to be connected therewith. The reactive parts with the functional groups may be inherently provided in the resin elements, e. g. in side chains of the resin monomers, oligomers or polymers or in the hardener. Alternatively, they may be introduced in the resin element structure or at the surface thereof, by different techniques, for example by forming of co-polymers, interpenetrating networks, compounding or surface modification.

The composite structure according to another preferred embodiment comprises a laminate of two or more thermoset resin containing elements and one or more thermoplastic elements. Laminate means in the context of the present invention that a thermoset resin containing element layer and a thermoplastic element layer are arranged next to each other, followed by at least one additional thermoset resin containing element layer arranged next to the thermoplastic element layer. Thus, a laminate comprises at least two interfaces between a thermoset resin containing element and a thermoplastic element. Of course, more than three resin layers may be provided in a laminate so that a consecutive stack of thermoset resin containing element layers and thermoplastic element layers is provided. At each interface of such a laminate, the functional groups in the resin elements generate a chemical bond between the two resin elements to improve the strength at the interface and to avoid delaminating effects during use.

It is advantageous that the thermoset resin elements are reinforced resin elements having a reinforcing structure such as a fabric and a resin component which may be present in the element before curing (prepreg process) or may be impregnated during the curing process (injection molding process). In view of the invention, fabric is a layer of fibres that will strengthen the resin element. The layer is composed of stitched or woven fibres or comprises individual fibres placed together. Exemplified fibres preferably used in the field of composite structures, especially for blades for wind power technology, are glass fibres such as e-glass or high modulus glass fibres.

In an alternative embodiment of the composite structure according to aspects of the invention, the thermoplastic element is arranged at the surface of a thermoset resin element. This embodiment allows the addition of constructional means mainly made of thermoplastic materials at the surface area of thermoset resin elements. By the use of the functional groups in the uncured composite structures, the constructional means can be connected to the thermoset resins by means of chemical bonds resulting in improved interface strength. Thus, new laminate properties based on a combination of thermoplastic elements and thermoset resin containing elements can be achieved while the safety of the workers at the manufacturing sites can be improved or guaranteed at the same time.

These advantageous mechanical properties and the ease of manufacturing possibilities predispose the composite structures according to the invention for being used as blades, especially for blades being part of a wind turbine system. The high strength and reliability of the interfaces enables the production of blades having a better performance, for example a better aerodynamic profile.

Furthermore, it is preferred that blades with additional elements at the surface of the blades can be manufactured even if the additional elements comprise at least partly a thermoplastic material or are mainly made of a thermoplastic material, for example in order to provide a sufficient flexibility to this additional element. In this case, it is preferred that the blade according to the invention comprises a thermoplastic element as this additional element, wherein the thermoplastic element is part of an aerodynamic improving element. Such elements are known in current blade technology, for example as DinoShells (trademark of Siemens), DinoTails (Trademark of Siemens) or vortex generators. DinoTails, DinoShells, and vortex generators are add-ons that make the blades more efficient because they maximize the aerodynamic performance and robustness with regard to roughness sensitivity.

DinoTails are separated flaps, shaped like a tail fin on a stegosaurus, which are generally placed close to the blade tip to make the blades quieter and enhance lifting performance.

DinoShells are a combination of a flap known from racecars and ordinary flaps. They usually have an overlaid seashell structure. Therefore, they are fixed control surfaces attached near the trailing edge of the blade surfaces in order to increase lifting capacity especially on the thick part of the blade closest to the hub.

Vortex generators are aerodynamic turbulators designed to improve the flow of air over the wind turbine blades. They generally enhance the aerodynamic performance of a blade and are usually used on the part of a blade closest to the hub.

Of course, the use of the composite structures as described before in blades is not limited to the afore-mentioned specific embodiments, but can be used to add additional aerodynamic elements into or on the surface of blades.

Other objects and features of the present invention will become apparent from the following detailed descriptions considered in conjunction with the accompanying drawings. It is to be understood, however, that the drawings are designed solely for the purposes of illustration and not as a definition of the limits of the invention.

BRIEF DESCRIPTION OF THE DRAWINGS

FIG. 3 shows a schematic view of the cross-section through a composite structure and the chemical reactions occurring at the interfaces thereof during the curing process.

DETAILED DESCRIPTION OF INVENTION

In the diagrams, like numbers refer to like objects throughout. Objects in the diagrams are not necessarily drawn to scale.

Figure 1:
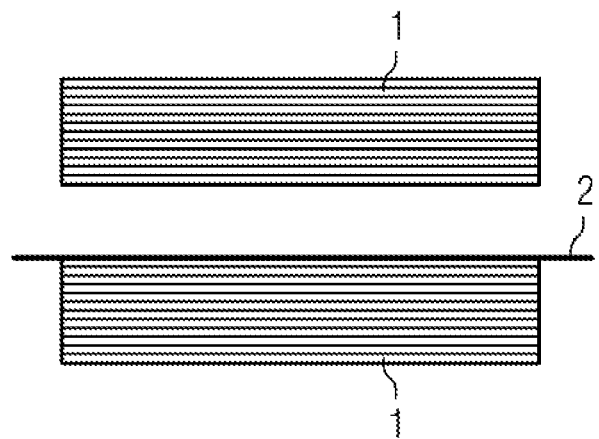
FIG. 1 shows a schematic view of the cross-section through the composite structure according to FIG. 1 in a state before assembling the thermoset resin elements and the thermoplastic element.

FIG. 1 shows a schematic view of the cross-section through a composite structure according to the invention in a state before assembling the thermoset resin containing elements 1 and the thermoplastic element 2. The composite structure comprises two thermoset resin containing elements 1 each composed of a number of fabric layers placed on each other in a parallel configuration to build up the two thermoset resin elements. The fabric layers may be formed by fabrics with or without a thermoset resin content. If the fabrics still contain a thermoset resin content, they are usually called prepregs. Otherwise, the fabric layers may be arranged together with the thermoplastic elements and then impregnated with thermoset resin. This is called resin injection process. Of course, both processes can be combined.

Between two thermoset resin containing elements 1, a thermoplastic element 2 can be arranged before curing will take place. This situation is shown in FIG. 1.

Figure 2:
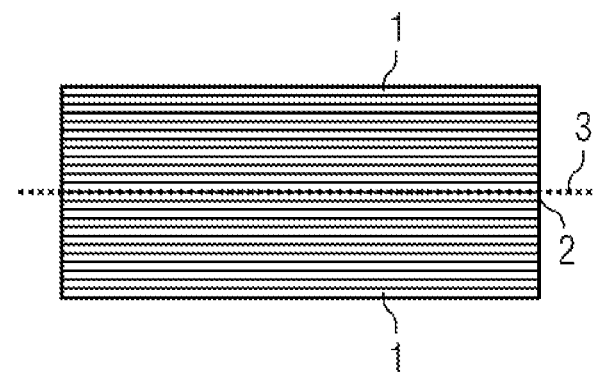
FIG. 2 shows a schematic view of the cross-section through a composite structure according to the invention in a state after assembling and curing.

FIG. 2 shows a schematic view of the cross-section through a composite structure according to FIG. 1 in a state after assembling and curing either by means of the prepreg process or the resin injection process. The composite structure obtained comprises a thermoplastic element 2 between two thermoset resin containing elements 1 which are now connected by a strong bond at the interfaces 3 between the thermoset resins containing elements 1 and the thermoplastic elements 2. The bonds generated due to the curing reaction are covalent bonds between the functional groups which were present at the interface 3 between the thermoset resin containing elements 1 and the thermoplastic elements 2 before curing. Therefore, the two thermoset resin containing elements 1 are strongly fixed by means of the thermoplastic element 2 there between.

FIG. 3 shows a schematic view of the cross-section through a composite structure and the chemical reactions occurring at the interfaces 3 between the thermoset resin containing elements 1 and the thermoplastic element 2 during the curing process. In FIG. 3, it has exemplarily shown a reaction of a thermoplastic element 2 having amine groups at side chains thereof with epoxide groups of the thermoset resin containing elements 1, for example elements composed of epoxy resins with remaining side chains with epoxide functionality.

The skilled person knows from the afore-mentioned description that various changes as to the functional groups are possible. For example, the groups can be changed and amine functionality can easily be provided at the thermoset resin element surface, for example by using an amine hardener.

Although the present invention has been disclosed in the form of preferred embodiments and variations thereon, it will be understood that numerous additional modifications and variations could be made thereto without departing from the scope of the invention. For the sake of clarity, it is to be understood that the use of "a" or "an" throughout this application does not exclude a plurality, and "comprising" does not exclude other steps or elements.

The invention claimed is:

1. A composite structure comprising
a number of thermoset resin containing elements and a number of thermoplastic elements and at least one interface between the thermoset resin containing elements and the thermoplastic elements,
wherein the thermoset resin containing elements and the thermoplastic elements comprise functional groups at the interface which bond to each other when the composite structure is cured and the functional groups are independently selected from amines, carboxylic acids, acid anhydrides, oxiranes, and derivatives thereof in their non-bonded condition;
wherein the thermoset resin containing element comprises a two or three component system having at least one resin component and at least one hardener;
and wherein the thermoplastic element comprises functional groups reactive with the resin component or with the hardener.

2. The composite structure according to claim 1, wherein the resin component comprises an epoxy resin.

3. The composite structure according to claim 1, wherein the composite structure comprises a laminate of two or more thermoset resin containing elements and one or more thermoplastic elements.

4. The composite structure according to claim 1, wherein the thermoplastic element is arranged at the surface of a thermoset resin containing element.

5. The composite structure according to claim 1, wherein the functional groups at the interface bond to each other by covalent bonds generated when the composite structure is cured.

6. The composite structure according to claim 3, wherein the one or more thermoplastic elements comprise one or more sheets.

7. A blade comprising a composite structure, said composite structure comprising:
a number of thermoset resin containing elements and a number of thermoplastic elements and at least one interface between the thermoset resin containing elements and the thermoplastic elements,
wherein the thermoset resin containing elements and the thermoplastic elements comprise functional groups at the interface which bond to each other when the composite structure is cured and the functional groups are independently selected from amines, carboxylic acids, acid anhydrides, oxiranes, and derivatives thereof in their non-bonded condition;
wherein the thermoplastic element is part of an aerodynamic improving element.

8. The blade according to claim 7, wherein the blade is part of a wind turbine system.

9. The blade according to claim 7, wherein the thermoplastic element forms a surface of the blade.

10. A composite structure comprising
a number of thermoset resin containing elements and a number of thermoplastic elements and at least one interface between the thermoset resin containing elements and the thermoplastic elements,
wherein the thermoset resin containing elements and the thermoplastic elements comprise functional groups at the interface which bond to each other when the composite structure is cured and the functional groups are independently selected from amines, carboxylic acids, acid anhydrides, oxiranes, and derivatives thereof in their non-bonded condition;
wherein the thermoset resin containing element comprises a two or three component system having at least one resin component and at least one hardener;
wherein the thermoplastic element comprises functional groups reactive with the resin component and with the hardener.

11. A composite structure comprising
a number of thermoset resin containing elements and a number of thermoplastic elements and at least one interface between the thermoset resin containing elements and the thermoplastic elements,
wherein the thermoset resin containing elements and the thermoplastic elements both comprise functional groups at the interface which bond to each other when the composite structure is cured and the functional groups are independently selected from amines, carboxylic acids, acid anhydrides, oxiranes, and derivatives thereof in their non-bonded condition;
wherein the thermoset resin containing element comprises a two or three component system having an epoxy resin component and at least one hardener;
wherein the functional groups of the thermoplastic elements that bond to the at least one hardener are selected from oxiranes, carboxylic acids and derivatives thereof.

12. A composite structure comprising
a number of thermoset resin containing elements and a number of thermoplastic elements and at least one interface between the thermoset resin containing elements and the thermoplastic elements,
wherein the thermoset resin containing elements and the thermoplastic elements both comprise functional groups at the interface which bond to each other when the composite structure is cured and the functional groups are independently selected from amines, carboxylic acids, acid anhydrides, oxiranes, and derivatives thereof in their non-bonded condition;
wherein the functional groups of the thermoplastic elements at the interface comprise amines.

13. The composite structure according to claim 12, wherein the functional groups of the thermoset resin containing elements at the interface comprise epoxides.

14. The composite structure according to claim 13 wherein covalent bonds are generated between the amines and the epoxides at the interface when the composite is cured.

\* \* \* \* \*